March 7, 1961  E. E. FRENCH  2,973,791
ROTATABLE TIRE SUPPORTING STAND
Filed Aug. 31, 1959  2 Sheets-Sheet 1
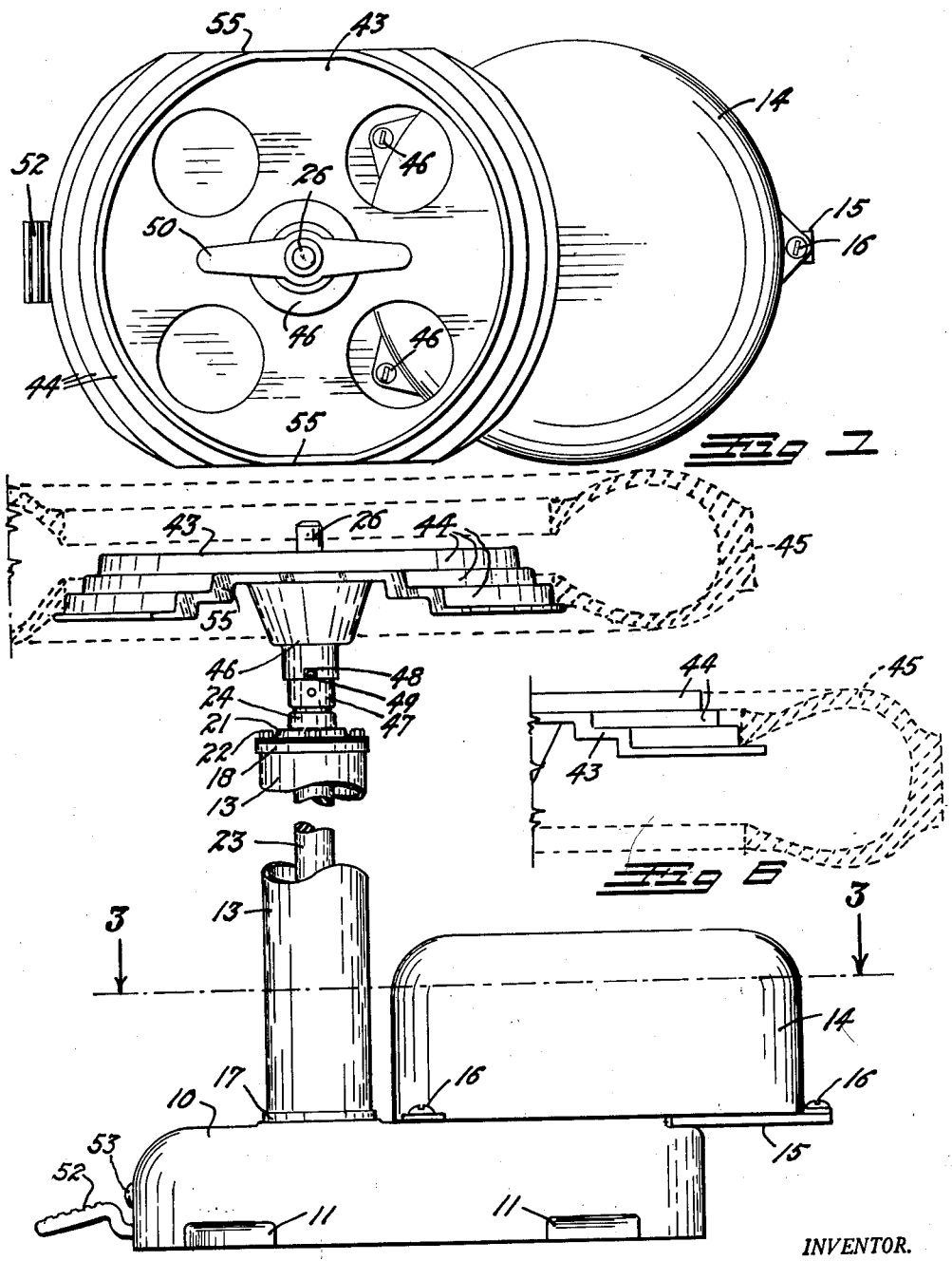
INVENTOR.
ELBY EDWARD FRENCH
BY
ATTORNEY

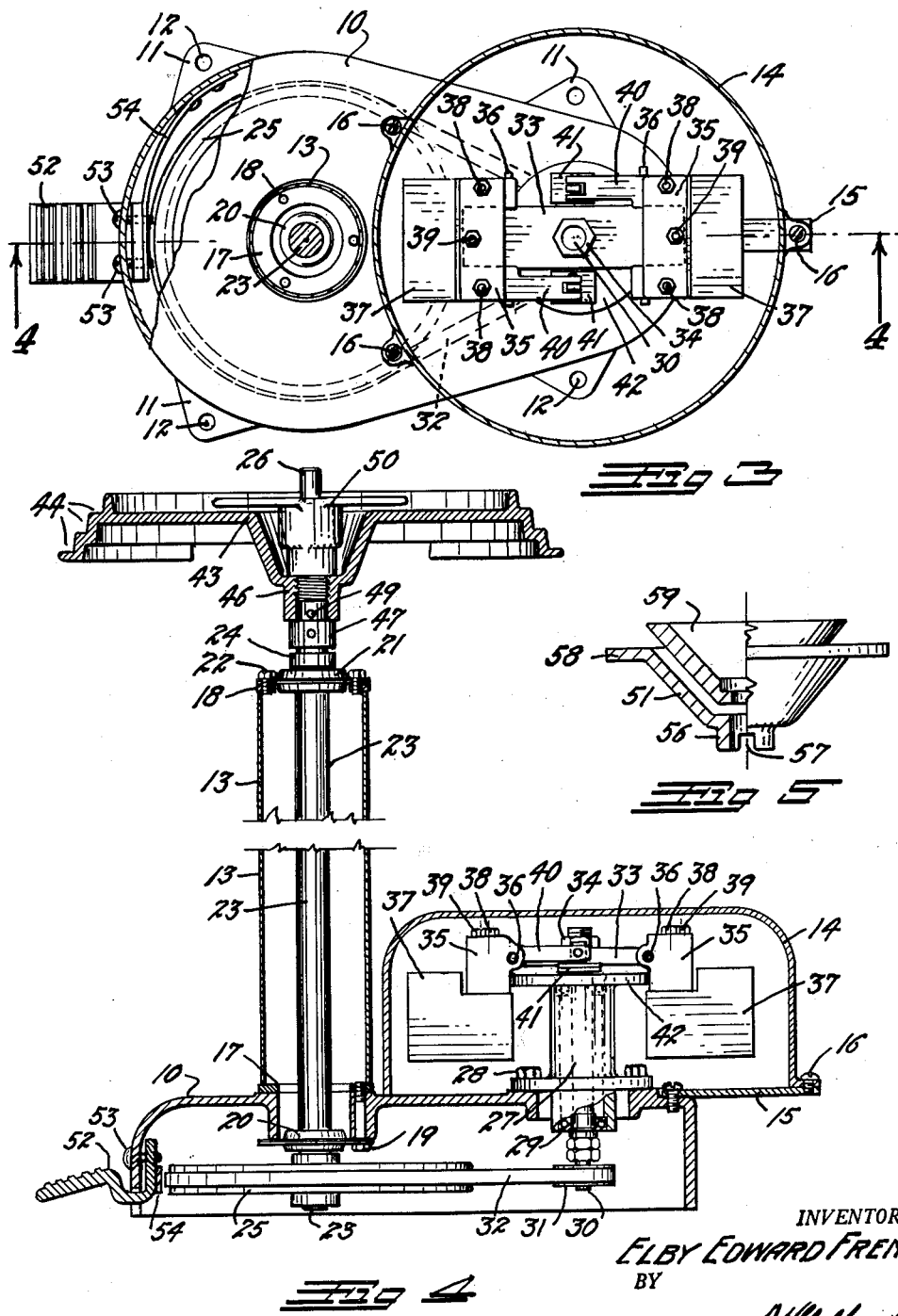

United States Patent Office 2,973,791
Patented Mar. 7, 1961

2,973,791
ROTATABLE TIRE SUPPORTING STAND

Elby E. French, Littleton, Colo., assignor to O.K. Rubber Welders, Incorporated, Littleton, Colo., a corporation of Colorado Filed Aug. 31, 1959, Ser. No. 837,258

1 Claim. (Cl. 144—288)

This invention relates to a stand for rotatably supporting an automobile tire either on or off a wheel for the purpose of cleaning, buffing and trimming the side walls thereof.

Tire casings, more particularly white side wall retreads, become soiled during use and during the retreading process, and upon occasion the edges of the retread are rough, ragged and uneven. It is, therefore, necessary in order to present a pleasing new appearance, to buff the side walls with motor driven buffing wheels to clean and renew the side walls and, if necessary, to trim the retread. It is difficult to obtain a uniform pleasing result with the casing resting on the floor or upon a work bench due to the difficulty in handling the heavy tires and wheels and the relatively heavy buffing motor.

The principal object of this invention is to provide an efficient supporting stand for supporting a tire or wheel in a horizontal, convenient, bench-height position and which will enable the tire to rotate during the cleaning and renewing operation so that a highly efficient uniform result can be obtained with a minimum of effort.

Another object of the invention is to incorporate with a tire spinning stand an inertia motor which will maintain a uniform spinning motion of the tire under varying loading pressures; to provide a speed governor which will prevent the buffing wheels from spinning faster than a predetermined rate so as to maintain a uniform buffing speed and prevent excessive overspeeding which would interfere with efficient uniform buffing and which might result in accidental damage to operators and equipment, to provide a simple and efficient braking device to stop the spinning tire when the necessary operations are completed; and to so construct the tire spinning stand that it will accommodate either tires or wheels of various sizes and of various makes.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved tire spinning stand as it would appear when arranged to receive a tire casing;

Fig. 2 is a side view of the stand of Fig. 1 partially broken away to conserve vertical drafting space;

Fig. 3 is a horizontal section looking downward on the line 3—3, Fig. 2;

Fig. 4 is a vertical section, partially broken away, taken on the line 4—4, Fig. 3;

Fig. 5 is a detail side view of a wheel adapter for use in mounting wheels upon the stand; and Fig. 6 is a fragmentary view illustrating how a tire casing may be mounted upon an adapter such as employed on the tire spinning stand.

The improved wheel and tire spinning and supporting stand is mounted upon a hollow base casting 10 provided with floor ears 11 which are drilled to provide screw holes 12 by means of which the base casting 10 may be screwed or bolted to the floor. A tubular post 13 arises from the base casting 10 to a suitable working height of, for instance, 30 inches, and an inverted-bell-shaped motor housing 14 is mounted upon the base by means of a bracket arm 15 and suitable cap screws 16.

The tubular post 13 consists of a cylindrical shell terminating at its lower extremity in an inwardly-extending bottom flange 17 and at its upper extremity in a similar top flange 18. The bottom flange 17 is secured to the base casting by means of cap screws 19 which extend upwardly through the top of the base casting 10 and are threaded into the flange 17.

The cap screws 19 also serve to concentrically support a lower ball bearing assembly 20 in place in axial alignment with the tubular post 13. A similar upper ball bearing assembly 21 is secured in place upon the top flange 18 by means of suitable cap screws 22. The ball bearing assemblies are conventional disc-type thrust shaft bearings available on the market.

The bearing assemblies 20 and 21 rotatably support a vertical shaft 23 through the medium of a thrust sleeve 24 resting upon the upper bearing assembly 21. The shaft 23 extends downwardly below the lower bearing assembly 20 to carry a relatively large V-belt pulley 25 within the base casting 10 and extends upwardly above the upper bearing assembly to form a threaded wheel spindle 26.

A governor spool 27 is vertically mounted on the base casting 10 by means of suitable cap screws 28 and supports ball bearings 29 for a vertical governor shaft 30. The governor shaft 30 terminates at its lower extremity in a relatively small V-belt pulley 31 which is in power transmitting relation to the large V-belt pulley 25 through the medium of an endless V-belt 32.

A governor head block 33 is mounted on the upper extremity of the shaft 30 by means of a clamp nut 34 and extends radially and oppositely outward from the shaft 30. A tiltable, inverted U-shaped, yoke member 35 is tiltably mounted on and over each extremity of head blocks upon a pivot pin 36 extending through the extremity of the yoke member. A governor weight 37 is secured to the bottoms of the two downwardly extending extremities of each yoke member, by means of cap screws 38, and extends outwardly and downwardly from the yoke member. The center of gravity of each weight 37 is therefore, positioned outwardly from its pivot pin 36 so that the weight tends to swing downwardly and inwardly. The degree of downward and inward movement of the weights can be preset by means of set screws 39 threaded through the bridging portions of the yoke members 35 so as to contact and rest upon the extremities of the head block 33 to support the overhanging portions of the weights.

A shoe arm 40 is formed upon and extends inwardly from each yoke member. The shoe arms terminate upon opposite sides of the shaft 30 where they support friction shoes 41 above a stationary friction disc 42 formed upon the governor spool 27. It can be seen that if the governor shaft 30 be rotated, centrifugal force will tend to swing the governor weights 37 outwardly and the friction shoes downwardly toward the friction disc 42. The centrifugal force increases in proportion to the increase in speed of the shaft so that eventually a point will be reached when the shoes will frictionally engage the surface of the disc sufficiently to prevent a further increase in speed.

The spindle 26 is designed to receive any desired one of a variety of adapters for supporting tires and wheels of various types and sizes. In Figs. 1, 2 and 4 a type of tire adapter 43 is illustrated having steps 44 of various diameters for receiving the beads of tire casings, such as indicated in broken line at 45, of various diameters. The adapter 43 is provided with a funnel-shaped hub 46 arranged to surround the spindle 26 and rest against a supporting collar 47 upon the spindle 26. The adapter 43 is provided with flat sides 55 to facilitate the placing and removal of the tire. The lower edge of the hub 46 is notched, as shown at 48. The notches 48 engage the opposite extremities of a key pin 49, extending through the spindle below the threads thereon. The notches 48 and the key pin 49 serve to key the adapter to the spindle.

A second form of adapter is illustrated in Fig. 5 designed for mounting a wheel with its tire upon the stand. The second form comprises a hollow, inverted cone-shaped cup 51 having a hub 56 to receive the spindle 26 provided with key notches 57 to receive the key pin 49, and a circular flange 58 upon which the wheel rests. A cone-shaped centering and clamping member 59 fits into the axial hole in the wheel and into the cup 51 to center the wheel thereon and to clamp the wheel against the flange 58.

The adapters are secured in place upon the spindle by means of a wing nut 50 which is threaded upon the spindle and which acts to clamp the hub of the adapter 43 agains the collar 47 and to force the centering and clamping members 59 into the axial wheel openings and the hub 56 of the cup 51 against the collar 47.

It is believed the use of the stand will be apparent from the above. Briefly, a motor driven buffing wheel is held against the side wall of the casing. This causes the casing, and through it the governor weights 37, to rotate at accelerating speed until the friction between the friction shoes 41 and the friction disc 42 prevents further acceleration. The buffing wheel now travels at a faster rate than the casing to create a buffing and cleaning action on the side wall of the casing.

When the buffing is completed, the spinning tire is stopped by stepping upon a brake pedal lever 52 which projects from the base casting 10. The brake pedal is suspended from, and slidably mounted on two pivot screws 53 adjacent and above the periphery of the large belt pulley 25 and is normally urged away from the V-belt 32 by means of a leaf spring 54. External pressure upon the pedal lever causes the spring 54 to engage the belt to bring the shaft 23 to rest.

For relatively light work such as cleaning, pointing and trimming, the casing 45 is positioned on the adapter 43 as shown in Fig. 2. For heavier work such as grinding or sanding the beads of the casing, the latter can be slipped completely over the adapter, the flat sides 55 providing clearance, to the position of Fig. 6 so that heavy pressure can be brought against the bead without collapsing the casing.

While a specific form of the improvement has been described and illustrated herein, it is to be understood that the same may be varied within the scope of the appended claim, without departing from the spirit of the invention.

Having thus described the invention what is claimed and desired secured by Letters Patent is:

A stand for rotatably supporting an automotive tire for side wall cleaning and buffing comprising: the combination of a base member; a vertical shaft rotatably mounted on and arising from said base member; a vertical counter shaft rotatably mounted on and arising from said base member in parallel, spaced relation to said first shaft; means transmitting rotation between said shaft; a weighted inertia member rotatable by said countershaft and acting to prevent said countershaft from exceeding a predetermined speed; a tubular post arising from said base member about said first shaft; upper and lower bearings in said post rotatably supporting said first shaft; a tire casing support mounted on the upper extremity of said first shaft; a plurality of annular steps about said support, said steps increasing in diameter as the periphery of the support is approached; and two opposed flat sides on said casing support the distance between said flat sides equalling the step of smallest diameter so that said support can be passed into a casing of said smallest diameter.

References Cited in the file of this patent
UNITED STATES PATENTS

| | | |
|---|---|---|
| 666,609 | Royal | Jan. 22, 1901 |
| 1,263,587 | Merryman | Apr. 23, 1918 |
| 2,045,778 | Huntley et al. | June 30, 1936 |
| 2,075,421 | Bennett | Mar. 30, 1937 |
| 2,178,101 | Hatch | Oct. 31, 1939 |
| 2,270,657 | Kraft | Jan. 20, 1942 |
| 2,515,167 | Arel | July 18, 1950 |